Patented July 2, 1935

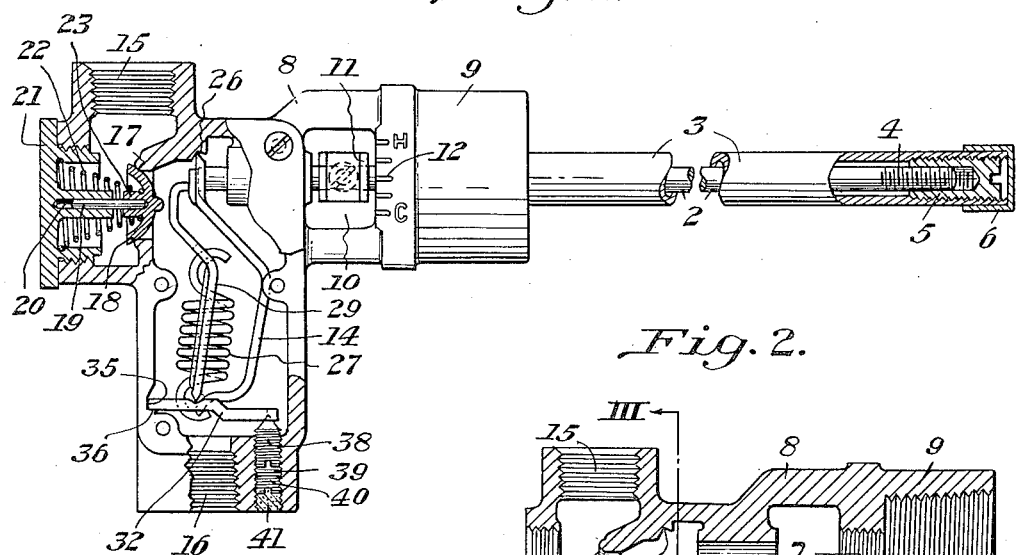

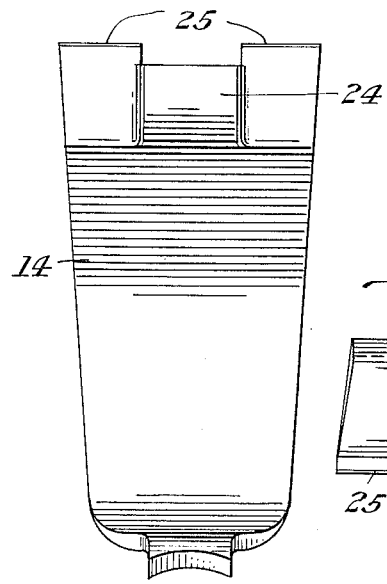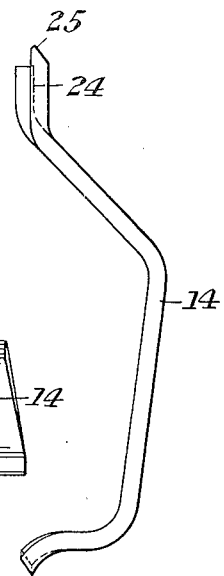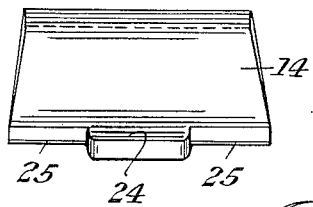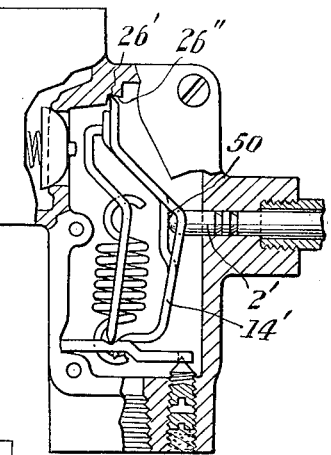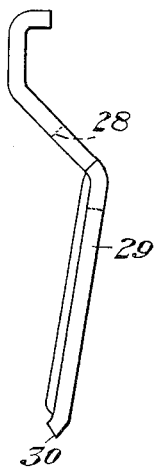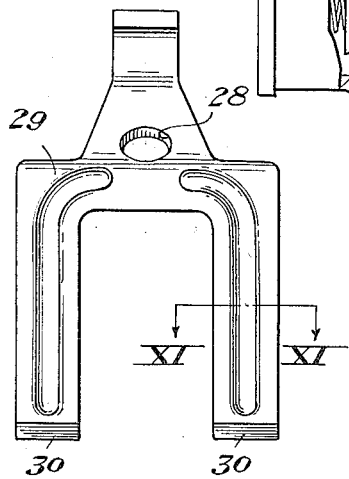

2,006,930

UNITED STATES PATENT OFFICE 2,006,930

THERMOSTATIC STRUCTURE

Robert E. Newell, Irwin, and David R. Drylie, Youngwood, Pa., assignors to Robertshaw Thermostat Company, Youngwood, Pa., a corporation of Pennsylvania Application October 25, 1934, Serial No. 749,952

10 Claims. (Cl. 236—48)

The present invention relates generally to thermostatic structures and more particularly to thermostatic control devices of the snap action type and contemplates an improvement on thermostatic control structures such as shown and described in the copending application of Robert E. Newell, Serial No. 719,281, filed April 6, 1934. While the present invention is particularly applicable to thermostatic structures wherein a snap action movement of the control element is desired, it is not necessarily limited to such structures for it may be applied to structures wherein a gradual movement of the control element is obtained instead of a snap action movement.

Considerable difficulty has been heretofore experienced in an attempt to provide a thermostatic control device utilizing levers or a spring for transmitting movement from the thermally responsive element to the control element and particularly in such structures where a snap action movement is imparted to the control actuating lever by a spring or similar means, in that it has been heretofore practically impossible to manufacture such a structure and obtain uniformity of operating range between the on and off temperatures. This is due to the fact that very slight variations in the length of the levers and in the tension of the spring causes a variation in the power of the device and, consequently, in the temperature differential required to snap the valve or other control element from its "on" position to its "off" position or vice versa. In the manufacture of snap structures of this character it is highly important that an accurate and uniform snap range be obtained but heretofore it has not been possible to manufacture any of the known types of snap action thermostatic control structures with a guaranteed uniform operating range between the on and off temperatures. In production, for instance, the structures now on the market may snap anywhere between a 10° temperature differential and a 30° temperature differential. Of the structures now on the market, no particular type is at all uniform in its performance and this is true regardless of whether the snap is effected by a clicker or any of the other known snap elements.

By our invention we provide a thermostatic control structure which overcomes the above difficulties and provides a way in which an absolutely accurate and uniform snap range may be obtained. This is accomplished in a relatively simple manner and in such a way as to not materially increase the cost of manufacture of structures of this character.

In the accompanying drawings, we have shown for purposes of illustration only the improvement which we provide applied to a thermostatic valve structure adapted to control the flow of fluid to a burner or the like. It will be understood, however, that our invention may be utilized in various other types of installations embodying various other types of control elements—for instance, a switch. It may also be embodied in various types of thermostatic control structures utilizing somewhat different apparatus for transmitting the movement of the thermally responsive element to the control element. It may also be utilized in constructions embodying various types of thermally responsive elements.

In the drawings,—

Figure 1 is a vertical sectional view through a thermostatic control structure bodying my invention;

Figure 2 is a vertical sectional view through a casing of the structure shown in Figure 1;

Figure 3 is a sectional view taken along the line III—III of Figure 2;

Figure 4 is a plan view of the adjustable bridge member providing a bearing for the lever for operating the control element;

Figure 5 is a sectional view taken along the line V—V of Figure 4;

Figure 6 is an elevational view of the main actuating lever;

Figure 7 is a side elevational view of the main actuating lever;

Figure 8 is an end view of the main operating lever;

Figure 9 is an elevational view of the secondary or control operating lever;

Figure 10 is a side elevational view of the lever shown in Figure 9;

Figure 11 is a sectional view taken along the line XI—XI of Figure 9; and

Figure 12 is a sectional view of a slightly different structure embodying our invention.

In the structure shown in Figures 1 to 11, inclusive, of the drawings, the thermostatic element is of the conventional rod and tube type comprising a rod 2 of non-expansible material and a tube 3 of expansible material. The rod 3 is threaded at its outer end 4 into a block 5 threaded in the outer end of the tube 3. The block 5 is threaded into the tube so that it may be moved relative to the tube for the purpose of effecting adjustment of the thermostat. A cap 6 is provided extending over the threaded end of the tube so as to prevent tampering with the adjustment of the structure after it has been placed in operation. The inner end of the tube 3 is provided with external threads for cooperation with threads 7 formed in the casing 8 carrying the valve and the valve operating mechanism. The casing 8 is provided with an extension 9, the outer end of which is internally threaded to cooperate with an attachment carried by the structure such as a water heater or the like to which the thermostatic structure is to be applied. The extension 9 of the casing 8 is provided with a horizontally extending opening 10 through which the non-expansible rod 2 passes. Within the opening 10 the rod is provided with an adjustable pointer 11 adapted to cooperate with suitable indicia 12 carried by the periphery of the extension 9.

The rod 2 extends into the internal portion of the casing 8 through an opening 13 and is adapted to cooperate with a main lever 14 for transmitting movement of the thermally responsive element to the valve for admitting or cutting off the fuel supply through the casing.

The casing 8 is provided with an inlet opening 15 and an outlet opening 16 on opposite sides of the valve seat 17 formed in the casing. A valve member 18 is provided within the casing for cooperation with the valve seat to control the flow of fluid therethrough. This valve member is provided with a stem 19 extending into an elongated opening 20 in the valve cap 21 which is threaded into the casing. The valve member 18 is maintained in position and normally forced towards its seat 17 by means of a spring 22, one of which cooperates with the boss 23 formed on the valve member and the other end of which bears against the cap 21 which is threaded in the casing. The cap 21 is provided for the purpose of permitting ready access to the internal portion of the casing for replacement of the spring 22 or the valve member 18. The slot in which the stem 19 rides and the stem 19 aid in maintaining the valve in cooperative relation with the valve seat. The length of the pin and opening also determines the extent to which the valve may be opened by the valve operating mechanism.

Means is provided within the casing for transmitting movement from the inner end of the rod 2 to the valve member 18. The inner end of the rod 2 is arranged to cooperate with and abut the main lever 14 adjacent the upper end thereof in a recessed portion 24 provided for this purpose. The upper end of the main lever 14 is provided with knife edges 25 for cooperation with a bearing 26 formed in the casing adjacent one end thereof. The lever 14 is bent downwardly and its lower end cooperates with one end of a tension spring 27, the other end of which passes through an opening 28 in the secondary or valve operating lever 29. This spring is a tension spring and normally forces the main lever 14 upwardly against its bearing. The valve operating lever 29 is forked at its lower end to receive the tension spring 27. The forked members of the valve operating lever 29 are provided with knife edges 30 for cooperation with bearings 31 formed in the bridge member 32. The bridge member 32 is substantially U-shaped and the arms 33 and 34 thereof cooperate with the transversely extending recessed portion 35 of the casing. The arms 33 and 34 rest on the shelf 36 provided by the recess in the casing. The bridge member 32 extends transversely of the casing and at the end opposite the arms 33 and 34 is recessed as at 37 to cooperate with the adjusting screw 38 extending into the casing through a threaded opening 39 therein. A threaded plug 40 is also threaded in the opening 39 to aid in maintaining the adjusting screw 38 in any adjusted position. The threaded opening 39 may be sealed with sealing wax 41 so as to prevent tampering with the structure after it has once been adjusted.

It will be readily seen from the above that adjustment of the screw 38 effects an adjustment of the bridge member 32 and the bearings 31 carried thereby and that in so adjusting the bridge member the bearing points of the levers are moved relative to each other and the tension on the tension spring 27 either increased or decreased. This alters the power of the spring and effects an accurate adjustment of the snap range of the structure.

One advantage in using a separate bridge member or plate 32 is that it may be made of hardened steel so that a very fine pivot bearing may be obtained thereon. This tends to increase the efficiency and accuracy of the structure. Furthermore, it may be plated or made of non-corrosive material different from the body of the casting.

In the embodiment of the invention shown in Figure 12, the rod 2' for transmitting movement from the thermostat to the main lever 14' is shown as abutting the main lever 14' at a point substantially half way between the ends thereof instead of adjacent the fulcrum point of the main lever as is the case in the structure shown in Figures 1 to 11, inclusive. The main lever 14' is provided with a recess 50 adapted to receive the pin 2'. In the structure shown in Figure 12 as well as in Figures 1 to 11, inclusive, the bearings 26' and 26, respectively, are shown as having the rear face 26'' of the bearing sloped inwardly. The provision of a bearing of this character has been found desirable in structures of this character and particularly in structures such as that shown in Figure 12 wherein the push rod for operating the main lever is positioned so as to engage the main lever at a point an appreciable distance from the fulcrum point thereof. We have found that where the operating rod for actuating the main lever is positioned an appreciable distance from the fulcrum point thereof, the impact of the control or secondary lever in snapping back and forth has a tendency to dislocate the end of the main lever and knock it out of its bearing. To overcome this we provide for sloping the rear face of the bearing inwardly whereby the end of the main lever is maintained therein against dislocation by reason of the impact of the control or secondary lever.

Our invention not only furnishes a snap action thermostatic structure which will operate within any desired snap range, but it provides a structure which may be readily adjusted in manufacture to obtain any given range. When the valve is assembled, the thermostatic couple is placed in water at a temperature of 140°, for instance. The screw 38 is then adjusted inwardly so that a maximum tension is obtained which would ordinarily give a range of say 20° or more. Then the pointer 11 is turned so that the valve will snap open. The thermostatic couple is then removed from the water at 140° and placed in water at a temperature of say 155° if a 15° snap range is desired. The adjusting screw 38 is then gradually turned outwardly so that the tension on the spring is diminished. The screw is continued outwardly until the lever 29 snaps to closed position. The structure then has a snap range which is exactly 15°, the difference in the water temperature in the first setting and in the second setting. As can be readily seen, this adjustment can be readily made during manufacture without appreciably increasing the cost thereof so that all structures will, if desired, have exactly the same snap range.

While we have shown and described a preferred embodiment of our invention, it will be understood of course that we do not intend to be limited thereby but that our invention may be otherwise embodied within the scope of the appended claims.

We claim:

1. In a thermostatic control device the combination with a main actuating lever, a secondary or control operating lever and a tension spring interconnecting the levers, of bearings for said levers and means for adjusting one of said bearings relative to the other to adjust the spring tension.

2. In a thermostatic control device the combination with a main actuating lever, a secondary or control operating lever, and linkage means under tension connecting the free portions of said levers, of bearings for said levers and means for adjusting the bearing of one lever relative to the bearing of the other lever to adjust the tension of said linkage means between the levers, whereby the operating temperature differential may be varied.

3. In a thermostatic control device the combination with a main actuating lever, a secondary or control operating lever and a tension spring interconnecting the levers, of bearings for said levers and means for adjusting the bearings of said secondary lever relative to the bearings of said main actuating lever to adjust the spring tension.

4. A thermostatic control device comprising a casing, a main lever pivotally mounted within said casing, thermally responsive means cooperating with and arranged to actuate said main lever, control means, a secondary lever pivotally mounted within said casing and arranged to cooperate with and actuate said control means, a tension spring interconnecting said levers, said main lever, secondary lever and interconnecting tension spring being so arranged that gradual movement of said main lever in one direction will impart a snap movement to said secondary lever, and means for adjusting the tension of said tension spring.

5. A thermostatic control device comprising a casing, a main lever pivotally mounted within said casing, thermally responsive means cooperating with and arranged to actuate said main lever, control means, a secondary lever pivotally mounted within said casing and arranged to cooperate with and actuate said control means, a tension spring interconnecting said levers, said main lever, secondary lever and interconnecting tension spring being so arranged that gradual movement of said main lever in one direction will impart a snap movement to said secondary lever, and means for adjusting said secondary lever relative to said main lever for adjusting the tension on said spring.

6. In a thermostatic control device, the combination with a casing having inlet and outlet passages and a valve controlling one of said passages, of a main lever arranged within said casing, a secondary lever arranged within said casing, each of said levers having bearing points, bearings for said levers, a spring operatively connecting said main and said secondary levers and at least partially supporting each of said levers in their assembled relation with their bearing points in pressure contact with their respective bearings, said secondary lever being operated by said spring to open said valve with a snap action, and means for adjusting the tension on said tension spring when in assembled relationship with said levers.

7. In a control device, the combination with a casing having inlet and outlet passages and a valve controlling one of said passages, of a main lever having a knife contact bearing within said casing, an adjustable bridge member within said casing, a secondary valve operating lever having knife contact with said bridge member within said casing, a tension spring operatively connecting said main and said secondary levers, said spring tending to hold the levers within their bearings and to maintain said levers in their assembled relation in said casing, and means for adjusting one end of said bridge member whereby the tension of said tension spring may be varied.

8. In a thermostatic control device, a casing, a main lever pivotally mounted in the casing, thermally responsive means for moving said lever about its pivot, an adjustable bridge member in said casing, a secondary lever pivotally mounted on said adjustable bridge member, control means arranged to be actuated by said secondary lever, a spring connecting said levers and arranged to transmit movement from said main lever to said secondary lever, said spring being arranged to at least partially support said levers and maintain them in pressure contact with their respective bearings and threaded means for adjusting said bridge member whereby the bearing for said secondary lever is adjusted relative to the bearing for said main lever.

9. A thermostatic structure comprising temperature responsive means, control means to be actuated thereby, means for transmitting movement from said temperature responsive means to said control means comprising a main lever arranged to be actuated by said temperature responsive means, a bearing for said lever, a knife edge pivotal connection between said lever and said bearing, a secondary lever arranged to actuate said control means, a bearing for said lever, a knife edge pivotal connection between said bearing and said secondary lever, and a tension spring connecting said levers for transmitting movement from the main lever to the secondary lever as the main lever moves the lever past a line between the pivot points of said levers whereby a snap action movement of said control means may be obtained, and adjusting means extending within said casing and cooperating with one of said bearings whereby the tension of said spring may be varied as desired.

10. In a thermostatic control device, the combination with a main actuating lever, a secondary or control operating lever and a tension spring interconnecting the levers, of bearings for said levers and means for adjusting one of said bearings relative to the other in a direction substantially longitudinally of the spring to adjust the spring tension.

ROBERT E. NEWELL.
DAVID R. DRYLIE.